(12) United States Patent
Gonzalez

(10) Patent No.: US 12,124,859 B2
(45) Date of Patent: Oct. 22, 2024

(54) HYBRID MULTI-TENANT FRAMEWORK FOR RECONFIGURING SOFTWARE COMPONENTS

(71) Applicant: Salesforce, Inc., San Francisco, CA (US)

(72) Inventor: Mariano Luis Gonzalez, Madrid (ES)

(73) Assignee: Salesforce, Inc., San Francisco, CA (US)

( * ) Notice: Subject to any disclaimer, the term of this patent is extended or adjusted under 35 U.S.C. 154(b) by 124 days.

(21) Appl. No.: 18/085,944

(22) Filed: Dec. 21, 2022

(65) Prior Publication Data

US 2024/0143340 A1 May 2, 2024

Related U.S. Application Data

(60) Provisional application No. 63/420,810, filed on Oct. 31, 2022.

(51) Int. Cl.
*G06F 8/60* (2018.01)
*G06F 9/445* (2018.01)
*G06F 9/54* (2006.01)

(52) U.S. Cl.
CPC ............ *G06F 9/44505* (2013.01); *G06F 8/60* (2013.01); *G06F 9/54* (2013.01)

(58) Field of Classification Search
CPC .......... G06F 9/44505; G06F 8/00; G06F 8/10; G06F 8/20; G06F 8/35; G06F 8/38; G06F 9/44; G06F 7/00; G06F 8/355; G06F 8/60
USPC .............................. 713/1; 717/116–117, 120
See application file for complete search history.

(56) References Cited

U.S. PATENT DOCUMENTS

| | | | |
|---|---|---|---|
| 11,314,630 B1 * | 4/2022 | Perumal | G06F 11/3688 |
| 2003/0135825 A1 * | 7/2003 | Gertner | G06F 40/143 |
| | | | 715/205 |
| 2005/0005261 A1 * | 1/2005 | Severin | G06F 8/316 |
| | | | 717/116 |
| 2009/0083297 A1 * | 3/2009 | Pohl | G06F 40/143 |
| 2009/0254881 A1 * | 10/2009 | Johnson | G06F 8/30 |
| | | | 717/117 |
| 2011/0184990 A1 * | 7/2011 | Murphy | G06F 8/41 |
| | | | 707/791 |

(Continued)

*Primary Examiner* — Paul R. Myers
(74) *Attorney, Agent, or Firm* — Butzel Long

(57) ABSTRACT

A computer-implemented method for exposing a software component through a predetermined protocol is disclosed. The method may include receiving a software component including at least one of a configuration, an operation, a trigger, and a parameter, and receiving a metamodel describes the configuration, the operation, the trigger, and the parameter. The method may also include generating a microservice and an API specification entirely based on the metamodel without additional coding. The computer-implemented method may further include deploying the microservice such that the microservice accepts incoming requests described by the API specification, and receiving a formatted response from the deployed microservice. The method may also include receiving a new configuration of the software component created on the deployed microservice, and generating a resource identifier that identifies the new configuration of the software component. The computer-implemented method may further include using the resource identifier to interact with the software component.

15 Claims, 6 Drawing Sheets

(56) References Cited

U.S. PATENT DOCUMENTS

| | | | |
|---|---|---|---|
| 2021/0073654 A1* | 3/2021 | Ameri | G06F 16/9536 |
| 2022/0129252 A1* | 4/2022 | Abdul Rashid | G06F 8/60 |
| 2022/0357936 A1* | 11/2022 | Duggal | G06F 8/60 |
| 2023/0244552 A1* | 8/2023 | Dewhare | G06F 8/73 |
| | | | 719/328 |
| 2023/0297366 A1* | 9/2023 | Wigglesworth | G06F 8/355 |
| | | | 717/120 |
| 2023/0297395 A1* | 9/2023 | Hu | G06F 9/44505 |
| | | | 713/1 |

* cited by examiner

HYBRID MULTI-TENANT FRAMEWORK FOR RECONFIGURING SOFTWARE COMPONENTS

CROSS-REFERENCE TO RELATED APPLICATIONS

This non-provisional patent application claims priority to U.S. provisional patent application No. 63/420,810, filed on Oct. 31, 2022, the contents of which are incorporated herein by reference in their entirety and should be considered part of this specification.

BACKGROUND

Traditionally, technology-based organizations need to use legacy libraries as much as newer applications that use a microservice architecture. The microservices may depend on or benefit from the legacy libraries. Migration of the legacy libraries to microservices, however, is not easy because the two technologies generally are not directly compatible. As an alternative, rewriting the libraries entirely into microservices is cumbersome and expensive, especially when there are periodic and frequent releases of the libraries.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
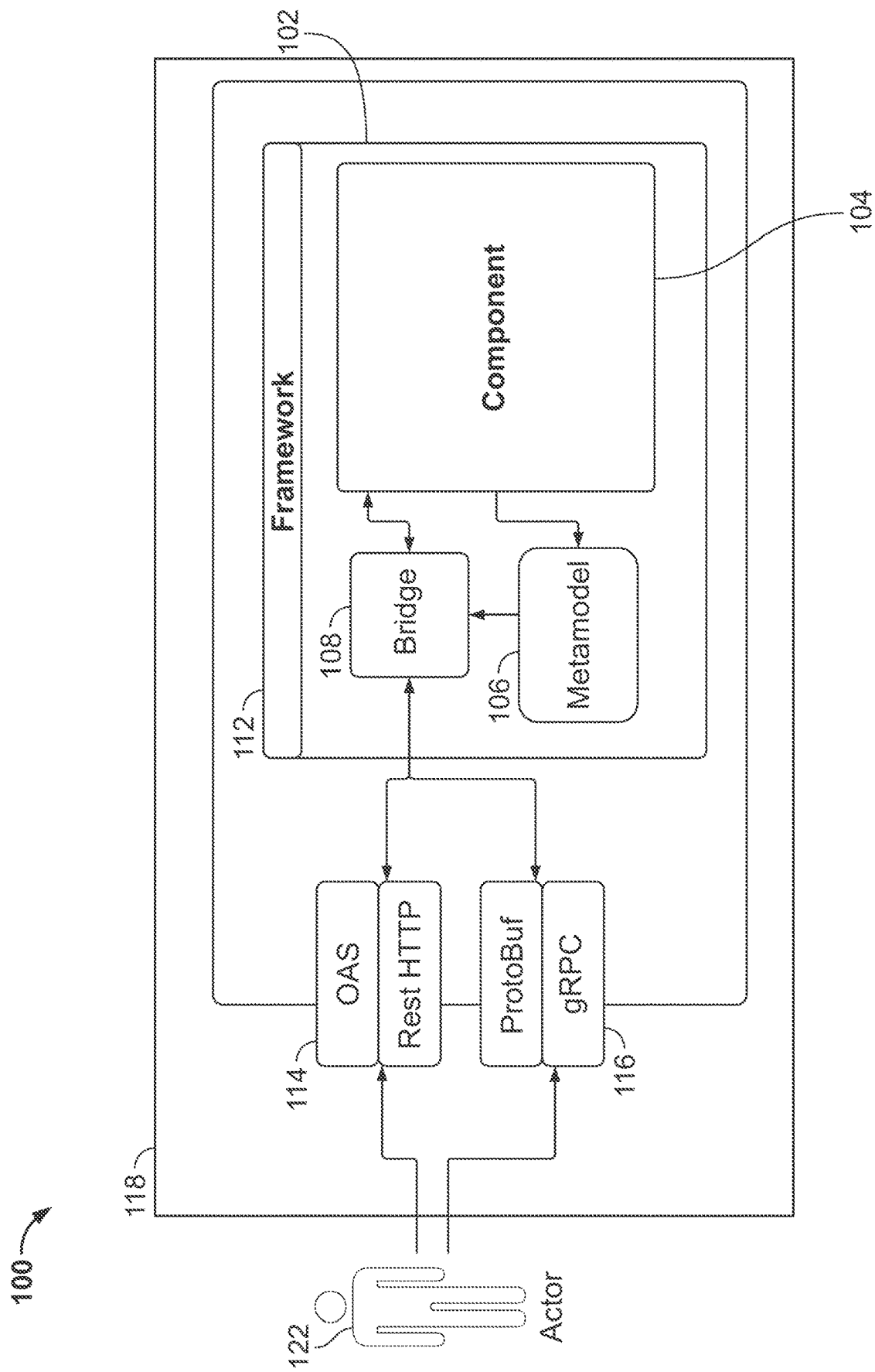
FIG. 1 is a block diagram illustrating an example standard view of a system for exposing a software component through a predetermined protocol.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

The present disclosure provides techniques for creating and manipulating a set of reusable software components, metamodels and microservices connected via APIs, which may be built from conventional software libraries. Embodiments disclosed herein allow for reconfiguring existing reusable software components originally developed as code libraries or the like and exposing them as microservices. Embodiments may also provide a metadata driven framework that improves on the existing process of migration of the reusable software components.

The framework processes existing configurable software components and exposes them as microservices. A metamodel of a software component is generated automatically or in a combined automatic process based on input from a human operator or developer. The metamodel provides a functional and semantic description of the behavior of the exposed component(s). A bridge, acting as a mediator between the component(s) and a selected protocol, parses the metamodel and transforms it into an API specification compatible with the protocol. The framework generates a microservice entirely based on the metamodel without requiring development of additional coding by a software developer. The codeless conversion process provides a simpler and more efficient solution for migration and deployment of software components, compared to conventional techniques for adapting legacy systems. The microservice can accept incoming requests as described by the generated API specification. The bridge parses the incoming requests, operations and triggers of the component(s) are exposed, and errors are raised in protocol-appropriate formats. The output of the microservice is transformed into a protocol-compatible format and sent back to a consumer of the microservice end user.

The framework enables a hybrid resource deployment strategy involving software components that are maintained on a single code base. Legacy applications may continue to use the software components as they are, while newer applications may consume them as microservices.

The framework further enables a multi-tenant architecture. The multi-tenant architecture ensures that a single microservice instance may functionally enable multiple configurations for the same component. That is, a single microservice arrangement as disclosed herein may be used to serve multiple users from different logical tenants in the system that uses the microservice, without risk of data from one tenant being exposed to any other. Using a Facebook connector as a specific example, a framework and microservice as disclosed herein may be used to expose the conventional Facebook connector as a service. Multiple configurations may be created on a single microservice instance, each related to different users. In that way, the microservice is multi-tenant because a single instance is serving requests from different users.

In an aspect of the disclosed subject matter, a computer-implemented method is disclosed for invoking a software component through a predetermined protocol. The software component includes at least one of a configuration, an operation, a trigger and a parameter.

The configuration includes a set of default run-time application options used to customize non-deployment features of the software component.

The parameter characterizes the software component by a key-value pair including a parameter key representing a unique identifier for the parameter and a parameter value characterized by a parameter data type. Parameters are modeled by describing their key, the type of their value (string, number, boolean, date, custom and the like), whether the parameter is mandatory or optional and if it has a default value.

The trigger is a mechanism that executes a program routine of the software component when a conditional event occurs on satisfaction of a predetermined condition. A trigger is typically initialized through a set of parameters.

The operation includes invocable functions of the software component, the functions receiving a first set of parameters and generating corresponding outputs, and further wherein the trigger is initialized through a second set of parameters.

The computer-implemented method may include receiving a software component and a metamodel of the software component. The metamodel describes the configuration, the operation, the trigger and the parameter of the software component as named parameters. The computer-implemented method may also include receiving a deployed microservice, wherein the microservice generated based on the metamodel, and receiving an API specification, wherein the API specification is generated based on the metamodel and compatible with the predetermined protocol. The computer-implemented method may also include creating a new configuration of the software component on the deployed microservice. The new configuration may have a software component endpoint compatible with the descriptions provided by the metamodel.

In one embodiment, the computer-implemented method may include receiving a software component and a first metamodel of the software component. The first metamodel describes the configuration, the operation, the trigger and the parameter of the software component as named parameters. The computer-implemented method may also include receiving a deployed microservice, wherein the microservice generated based on the first metamodel, and receiving an API specification, wherein the API specification is generated based on a second metamodel and compatible with the predetermined protocol. The computer-implemented method may also include creating a new configuration of the software component on the deployed microservice. The new configuration may have a software component endpoint compatible with the descriptions provided by either the first metamodel or the second metamodel. In one embodiment, the first metamodel and the second metamodel may be the same.

The computer-implemented method may further include receiving a resource identifier that identifies the new configuration of the software component, and using the resource identifier to send subsequent requests to the API specification. The computer-implemented method may also include invoking functions of the software component using the parameter of the software component, and responsive to the functions of the software component being invoked, receiving responses from the deployed microservice.

The resource identifier is provided by a bridge that transforms the metamodel and translates the descriptions of the software component into corresponding features of the generated microservice based on the predetermined protocol.

The bridge intercepts the incoming requests to the generated microservice and transforms the corresponding output from the generated microservice into invocations compatible with the software component.

The operation and the trigger are exposed in corresponding formats compatible with the predetermined protocol.

The computer-implemented method may further include invoking the trigger and receiving a response from the software component.

The new configuration of the software component may be discarded after a predetermined period of idleness or at a chosen point of time.

In an aspect of the disclosed subject matter, a computer-implemented method is disclosed for exposing a software component through a predetermined protocol. The computer-implemented method may include receiving a software component comprising at least one of a configuration, an operation, a trigger, and a parameter, and receiving a metamodel that describes the configuration, the operation, the trigger and the parameter of the software component as named parameters. The computer-implemented method may also include generating a microservice based on the metamodel, and generating an API specification based on the metamodel, wherein the API specification is compatible with the predetermined protocol. The computer-implemented method may further include deploying the microservice such that the deployed microservice accepts incoming requests described by the generated API specification, and responsive to the incoming requests, receiving a formatted output from the deployed microservice. The format of the output is compatible with the predetermined protocol. The computer-implemented method may also include receiving a new configuration of the software component, wherein the new configuration is created on the deployed microservice, and generating a resource identifier that identifies the new configuration of the software component. The computer-implemented method may further include responsive to subsequent incoming requests to the deployed microservice, using the resource identifier to interact with the software component.

The computer-implemented method may also include maintaining the software component and the generated microservice on a common code base.

The computer-implemented method may further include providing a first set of applications that consume the software component and a second set of applications that consume the generated microservice.

In an aspect of the disclosed subject matter, a computer-implemented method is disclosed for metamodeling a software component through a predetermined protocol. The method may include providing a software component, wherein the software component comprises a configuration, an operation, a trigger and a parameter and generating a metamodel of the software component, the metamodel describing the configuration, the operation, the trigger and the parameter of the software component as named parameters.

The computer-implemented method may also include making the metamodel available for transformation into an API specification compatible with the predetermined protocol.

The metamodel may further describe capabilities, semantics and dependencies of the software component.

FIG. 1 is a block diagram illustrating an example standard view of a system 100 for exposing a software component through a predetermined protocol 102. As a non-limiting example, the system 100 may include a monolithic application server, such as a Mule Runtime 102 and a Mulesoft connector 104 that is to be exposed or converted into a microservice, though similar processes may be used for any similar components that are to be exposed as microservices as disclosed herein. In such a system, the conventional connectors 104, disadvantageously, typically only can be used from within an associated application 102. In other words, a user needs to rewrite the application 102 and deploy it on a full-fledged server in order to reuse the connectors 104 on any other application. These conversion restrictions make it cumbersome and expensive for other applications to leverage the connectors 104. Further, the connectors 104 are written in the Java language and may not work well with applications that use languages other than Java.

Referring to FIG. 1, a system 100 as disclosed herein exposes the connectors 104 as microservices using a metadata model 106, a bridge 108 and a metadata driven framework 112. The metamodel 106 may be generated automatically or in a combined manual/automatic process based on input from a human developer. For example, the model 106 may be adapted automatically by the system based on components similar to connectors 104 for which a metamodel was previously created. The metamodel 106 provides a functional and semantic description of the behavior of the connectors 104 and describes the related configurations, operations, triggers and functions of the connectors 104 as named set of parameters. As used herein, a 'bridge' is a resource that executes an original software component based on a request coming through an application programming interface (API) and sends a response through the same channel. A 'configuration' is a set of default run-time application options used to customize non-deployment features of a software component. An 'operation' is an invocable function of a software component, wherein the functions receive a first set of parameters and generate corresponding outputs. A 'trigger' is a mechanism that executes a program routine of the software component when a conditional event occurs on satisfaction of a predetermined condition. A trigger is typically initialized through a set of parameters. A 'parameter' is a key-value pair characterizing a software component. The pair includes a parameter key representing a unique identifier for the parameter and a parameter value characterized by a parameter data type.

The bridge 108 of FIG. 1 acts as a mediator between the connectors 104 and the protocol 102, parses the metamodel 106 and transforms it into an API specification compatible with the corresponding protocol 102. For instance, for a Representational State Transfer (REST) protocol, the bridge 108 transforms the metamodel 106 into an OpenAPI Specification (OAS) file 112, while for the Google Remote Procedure Call (gRPC) protocol, the bridge 108 transforms the metamodel 106 into a Protocol Buffers (ProtoBuf) file 112. In a similar manner, for Simple Object Access Protocol (SOAP) protocol, the bridge 108 transforms the metamodel 106 into a Web Services Description Language (WSDL) file (not shown). More generally, the bridge may be configured to transform a metamodel into a generic protocol suitable to provide an interface to the associated connectors.

Referring again to FIG. 1, the protocol 102, the connectors 104, the metadata model 106 and the bridge 108 are integrated into a framework 112. The framework 112 converts the connectors 104 through a set of protocol-specific API specifications 114 and 116 and generates a microservice 118 entirely based on the metamodel 106. The conversion of the connectors 104 takes place without requiring development of additional coding and as a result, the microservice 118 is generated as a wrapper. In other words, the microservice 118 bundles the connectors 104, the metamodel 106, the bridge 108, the framework 112, the APIs 114 and 116 into a new, self-contained end component. The microservice 118, as self-contained component, can accept incoming requests as described by the generated API specifications 114 and 116. The bridge 108 parses the incoming requests, the operations and triggers of the connectors 104 are exposed, and errors are raised in protocol-appropriate formats. The microservice 118 responds to the incoming requests in protocol-compatible formats. The output of the microservice 118 is sent back to a consumer 122 of the microservice end user.

Notably, the legacy connectors 104 are not replaced entirely by the microservices 118 or removed from the system in any way and may be left intact and functional within the system. Thereby, legacy applications may continue to use the connectors 104 as they are, while newer applications may consume them as microservices 118. This allows for newer applications to be developed that use new microservices, without requiring legacy applications to be modified to accommodate the microservices.

The framework 112 further enables a multi-tenant architecture. The multi-tenant architecture of FIG. 1 ensures that a single microservice instance 118 may functionally enable multiple configurations for the same connectors 104. Using the connectors 104 example, this technology may be used, in one instance, to expose Facebook connectors as a service. In another instance, multiple configurations for the same connectors 104 may be created on a single microservice instance 118, wherein the configurations relate to different users. This way, the microservice is multi-tenant because a single instance is serving requests from different users.

In the metadata driven approach mentioned above, a developer does not need to do end-to-end coding or code conversion from one application to another, as would typically be required for conventional library-based arrangements. Instead, the legacy components 104 are directly exposed entirely based on the metamodel 106, the bridge 108 and the APIs 114 and 116, as microservice 118, without requiring development of additional coding by a software developer. The codeless conversion process provides a simpler and more efficient solution for migration and deployment of software components, compared to conventional techniques for adapting legacy systems.

Referring to FIG. 1, the APIs 114 and 116 execute the scheduled operations and handle the lifecycle of the exposed connectors 104 through respective configuration files (not shown). The configuration files are used to initialize the underlying components (by allocating resources, starting threads, etc.) and to supply the required initialization parameters. For instance, a configuration file for the connectors 104 may typically contain the connection information (instance URL, username, password, security token, etc.). At the time of activation of the connectors 104, the configuration file initializes the connectors 104 and establishes its connections to the Salesforce instances. Operations of the connectors 104 are then executed referencing the configuration file. Similarly, at the time of deactivation of the connectors 104, the configuration files are disposed and that releases the components resources, closing the connections to the Salesforce instances.

In an example, back-end banking applications and COBOL language applications in the banking industry may be converted into corresponding microservices using the technology described above. COBOL is a programming language that was popular in the 1970s or 1980s when banks started leveraging computers. A vast majority of banks around the world continue to run their backend applications on programs written in COBOL. Banks usually find it difficult to reconfigure the legacy COBOL applications because these 50-year-old programs are not easy to integrate with newer technologies. The library-to-microservice conversion technology described above allows easy conversion of the source COBOL applications by combining simple metadata models, bridges and APIs into a seamless conversion program, eliminating any need to write custom code bridges or to code end-to-end. Further, in this instance, the microservices are stateless entities and they do not need any configuration file, making the conversion process even more simple and efficient.

Figure 2A:
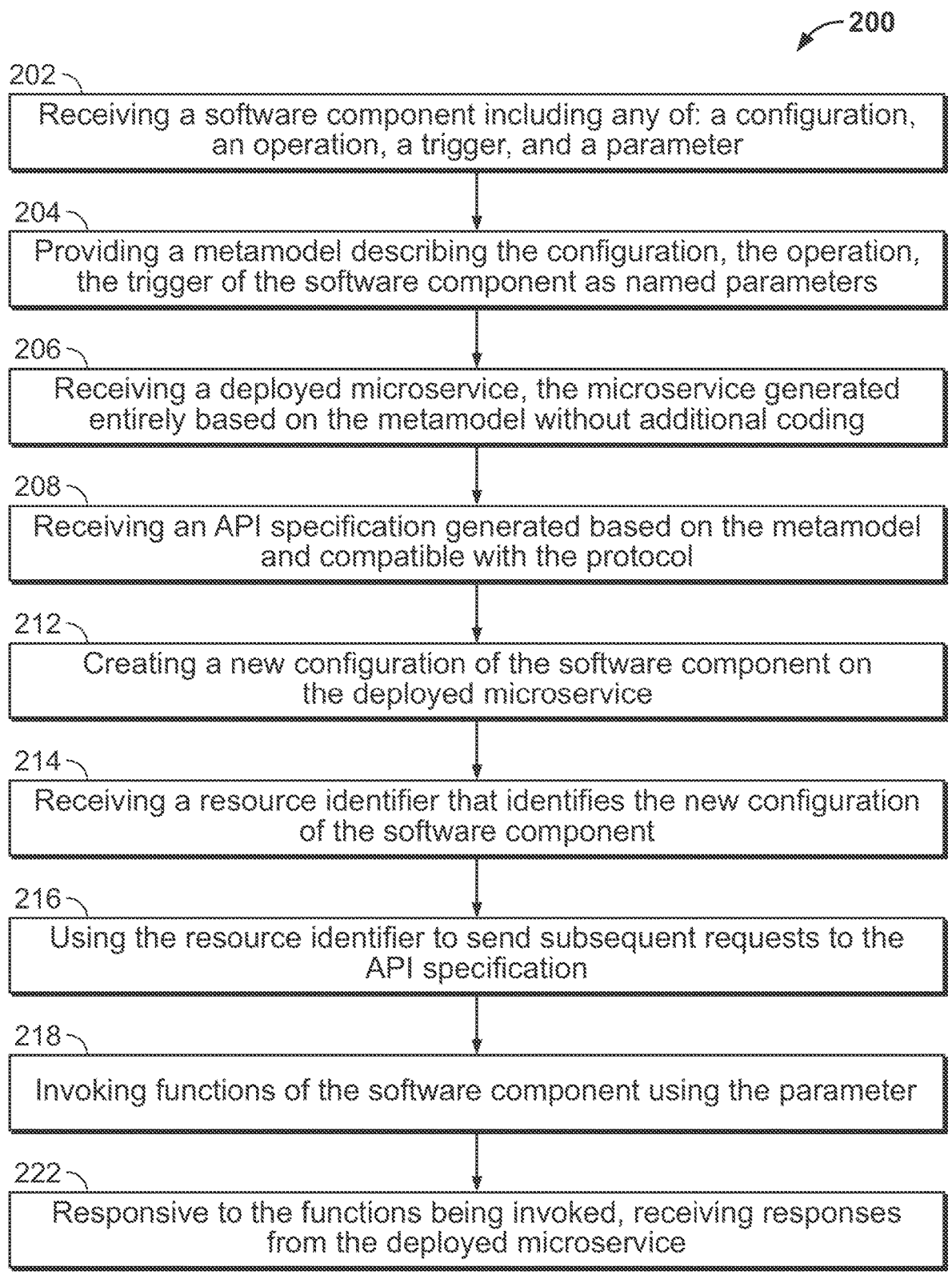
FIG. 2A is a flow diagram illustrating a consumer-perspective method for invoking a software component through a predetermined protocol, in accordance with an embodiment of this disclosure.
Figure 3A:
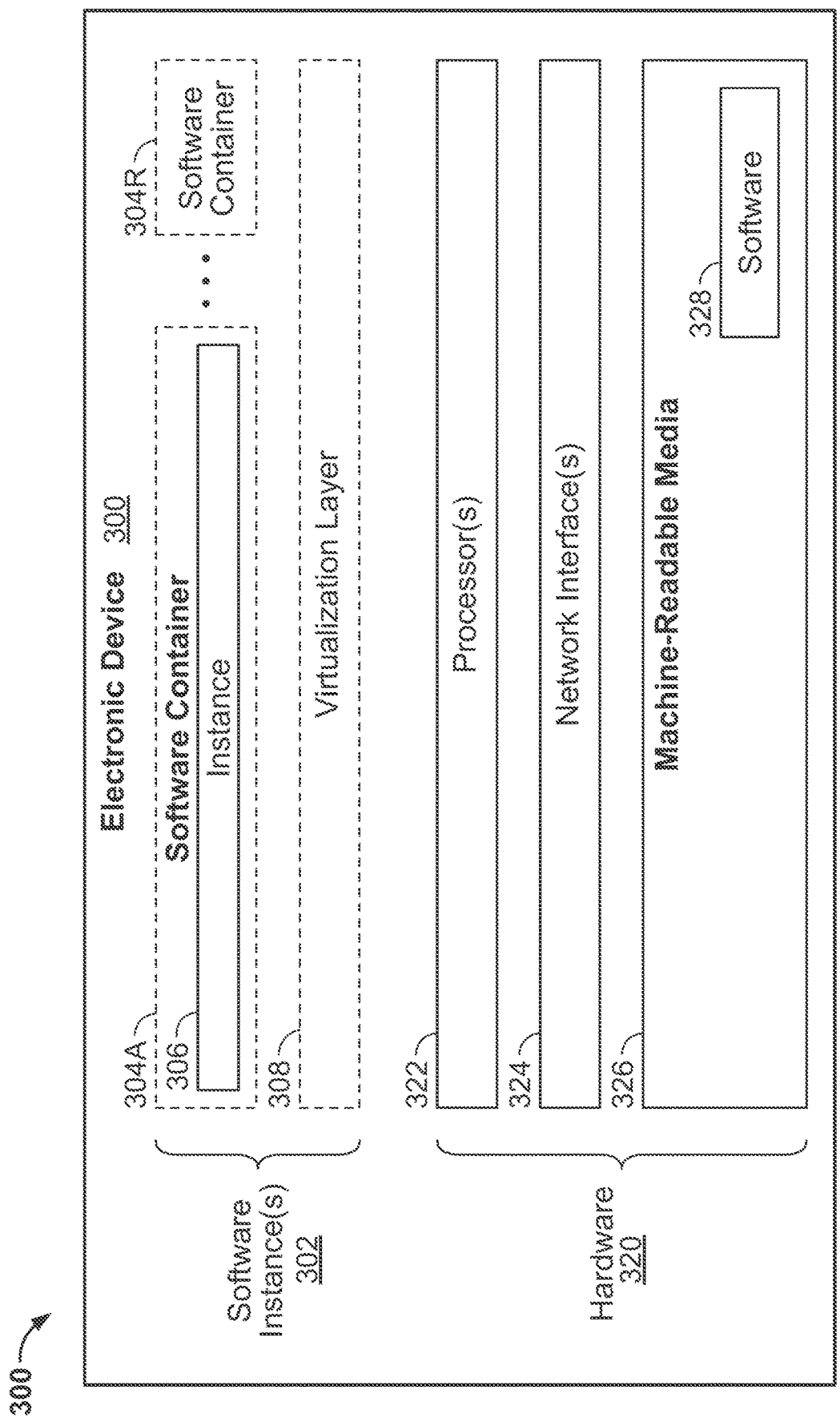
FIG. 3A is a block diagram illustrating an exemplary electronic device according to an example implementation.
Figure 3B:
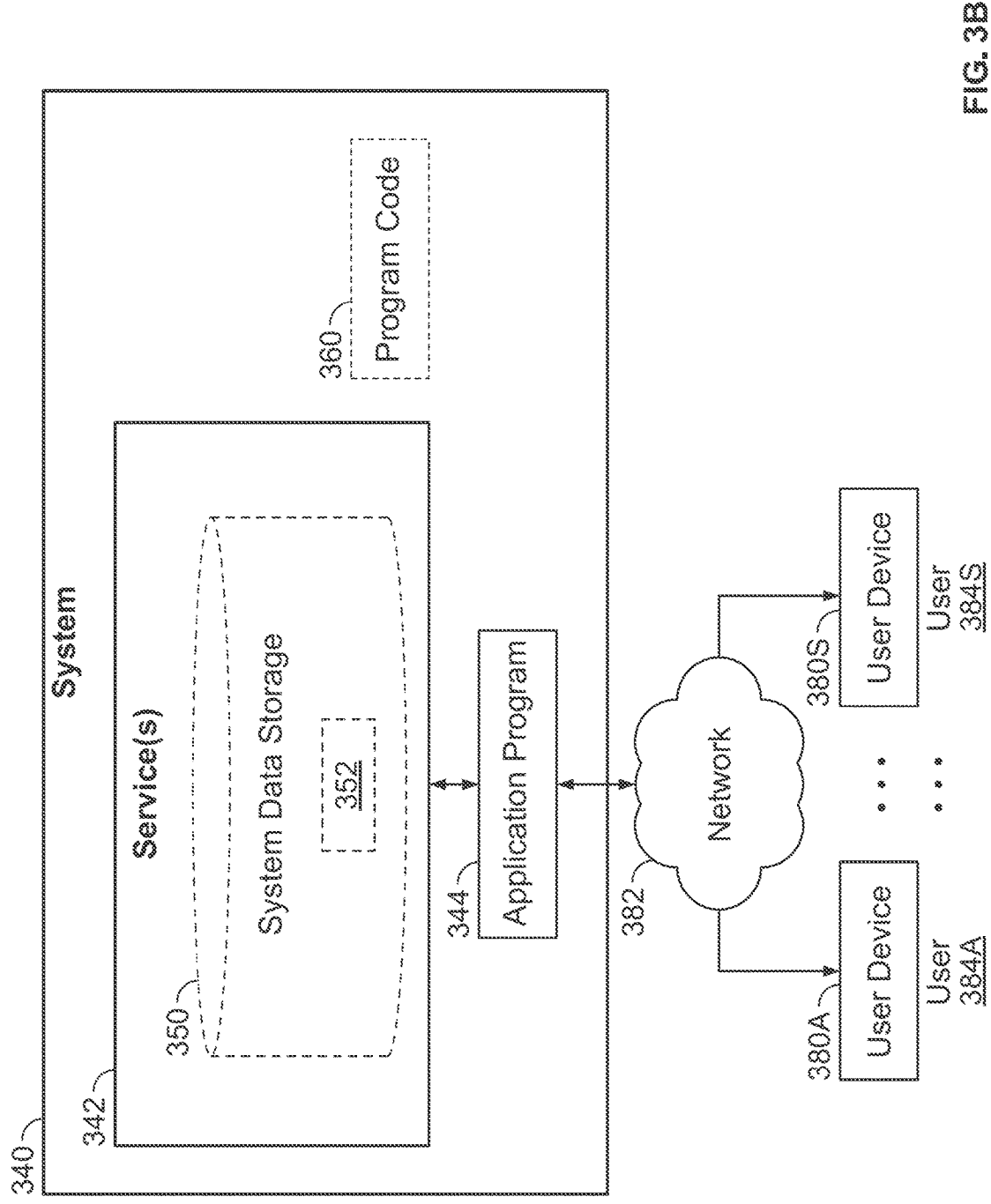
FIG. 3B is a block diagram of an exemplary deployment environment according to an example implementation.

FIG. 2A is a flow diagram illustrating a consumer-perspective method for invoking a software component through a protocol, as disclosed herein. The method 200 may be performed, for example, by a system as shown in FIG. 1 operating in conjunction with hardware as shown in FIGS. 3A and 3B.

The computer-implemented method 200 may include, as in step 202, receiving a software component including any of a configuration, an operation, a trigger, and a parameter. At 204, a metamodel of the software component is provided based on the software component. Before the metamodel is provided by the component, the metamodel may be obtained from another source or written by the consumer or automatically generated. The metamodel describes the related configuration, operation, trigger and parameters of the software component as named parameters. At 206, a deployed microservice is received. The microservice may be generated entirely based on the metamodel without requiring development of additional coding. At 208, an API specification is received. The API specification, generated based on the metamodel, is compatible with the protocol. At 212, a new configuration of the software component may be created on the deployed microservice. The new configuration has a software component endpoint compatible with the descriptions provided by the metamodel. At 214, a resource identifier is received. The resource identifier identifies the new configuration of the software component.

The resource identifier of step 214 may be provided by a bridge as previously disclosed, which transforms the metamodel and translates the descriptions of the software component into corresponding features of the generated microservice based on the predetermined protocol. The bridge intercepts the incoming requests to the generated microservice and transforms the corresponding output from the generated microservice into invocations compatible with the software component. The operation and the trigger are exposed in corresponding formats compatible with the predetermined protocol. At 216, the resource identifier is used to send subsequent requests to the API specification.

The computer-implemented method 200 of FIG. 2A may further include, as in step 218, invoking functions of the software component using the parameter. At 222, responsive to the functions being invoked, appropriate responses are received from the deployed microservice.

The new configuration of the software component may be discarded after a predetermined period of idleness, or at a chosen point of time, or when it is dynamically determined to be no longer needed.

Figure 2B:
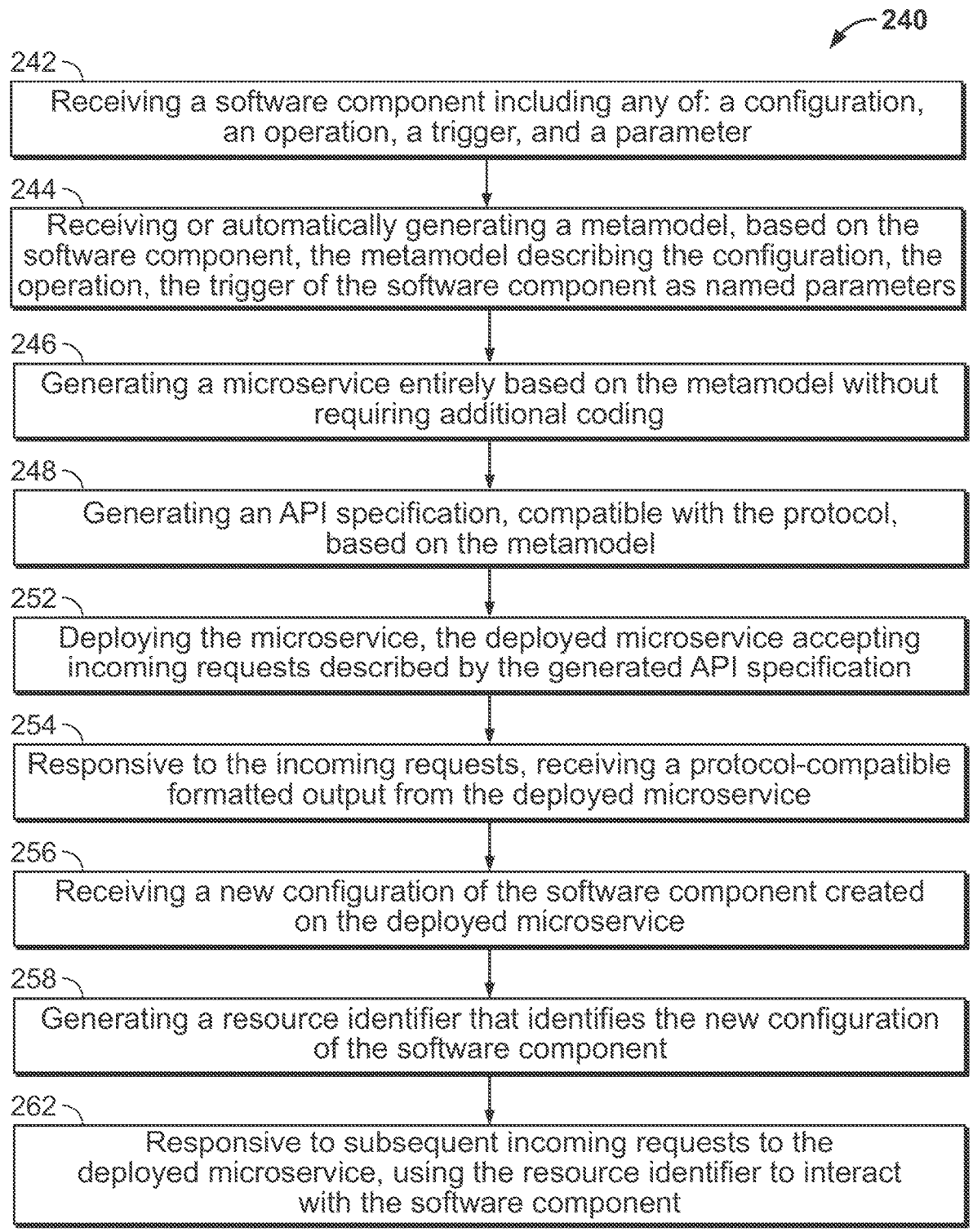
FIG. 2B is a flow diagram illustrating a framework-perspective method for transforming a metamodel into an application programming interface (API) specification and for generating a microservice from the API specification, in accordance with an embodiment of this disclosure.

FIG. 2B is a flow diagram illustrating a framework-perspective method for transforming a metamodel into an API specification and for generating a microservice from the API specification, as disclosed herein. The computer-implemented method 240 may be performed, for example, by a system as shown in FIG. 1 operating in conjunction with a hardware of FIGS. 3A and 3B.

The computer-implemented method 240 may include, as in step 242, receiving a software component including any of a configuration, an operation, a trigger, and a parameter. At 244, a metamodel of the software component is provided based on the software component. Before the metamodel is provided by the component, the metamodel may be obtained from another source or written by the consumer or automatically generated. The metamodel describes the related configuration, operation, trigger and parameters of the software component as named parameters. At 246, a microservice is generated entirely based on the metamodel without requiring development of additional coding. At 248, an API specification is generated based on the metamodel. The API specification is compatible with the protocol. At 252, the microservice is deployed. The deployed microservice is configured to accept incoming requests described by the generated API specification. At 254, responsive to the incoming requests, a formatted output may be received from the deployed microservice. The formatted output is compatible with the protocol.

At 256, a new configuration of the software component is received. The new configuration of the software component may have been created on the deployed microservice. At 258, a resource identifier is generated. The resource identifier identifies the new configuration of the software component.

The resource identifier of step 246 is generated by a bridge that transforms the metamodel and translates the descriptions of the software component into corresponding features of the generated microservice based on the predetermined protocol. The bridge intercepts the incoming requests to the generated microservice and transforms the corresponding output from the generated microservice into invocations compatible with the software component. At 262, responsive to subsequent incoming requests to the deployed microservice, the resource identifier is used to interact with the software component.

The computer-implemented method 240 may also include maintaining the software component and the generated microservice on a common code base. The computer-implemented method 240 may further include providing a first set of applications that consume the software component and a second set of applications that consume the generated microservice. Unlike conventional applications based on reusable component libraries, the sets of applications disclosed herein which consume the associated component and/or microservice need not be reconfigured or otherwise manipulated by developers, since they are designed to use the microservice framework disclosed herein.

Figure 2C:
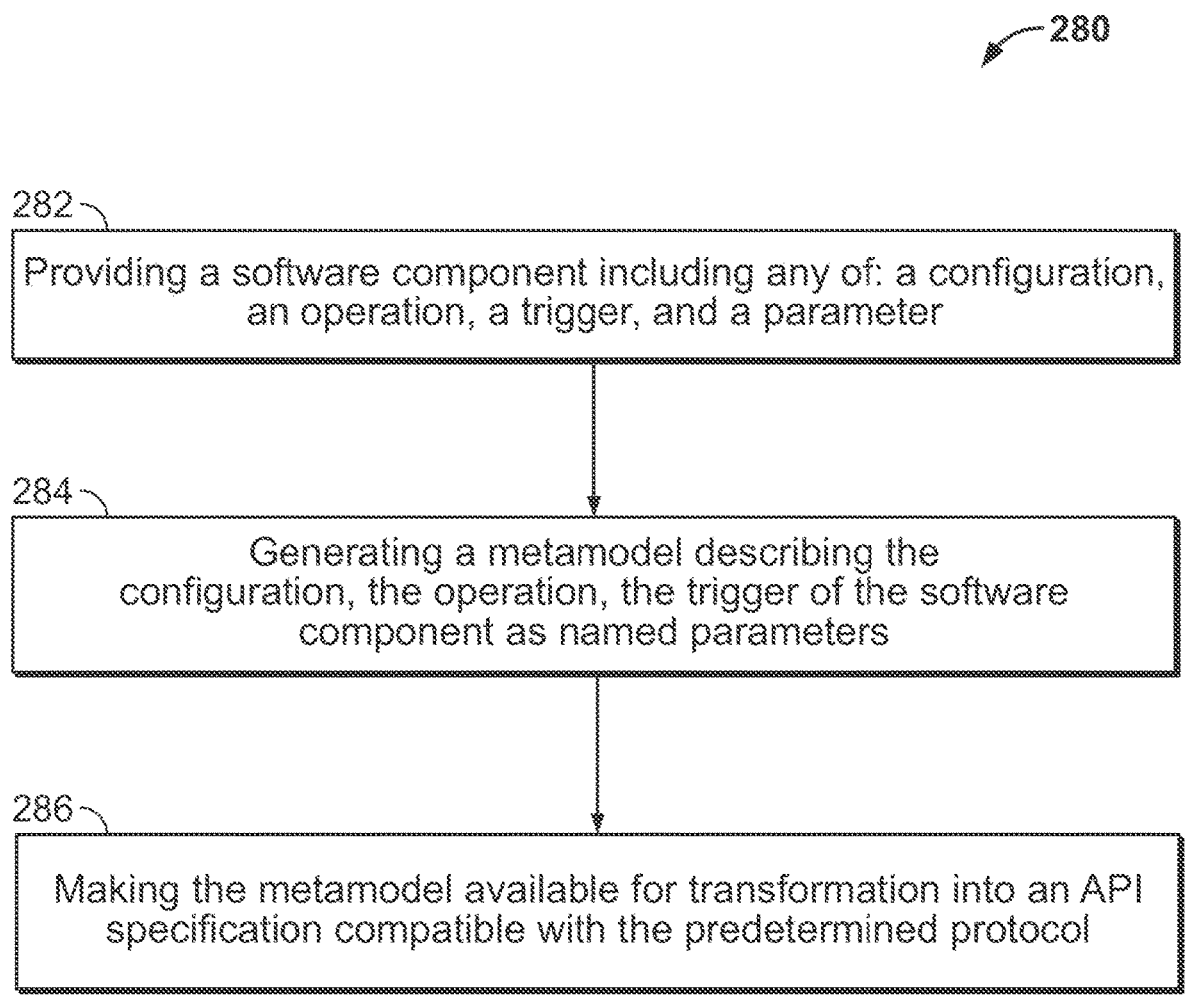
FIG. 2C is a flow diagram illustrating a provider-perspective method for metamodeling a software component before the component is exposed as a microservice, in accordance with an embodiment of this disclosure.

FIG. 2C is a flow diagram illustrating a provider-perspective method 280 for metamodeling a software component before the component is exposed as a microservice, as disclosed herein. The method 280 may be performed, for example, by a system as shown in FIG. 1 operating in conjunction with a hardware of FIGS. 3A and 3B. In the description below, an illustrative library-to-microservices conversion process is provided as an example, but it will be understood that an equivalent process may be performed for any arbitrary component as needed.

The method 280 may include, as in step 282, providing a software component (such as the connector 104 of FIG. 1) that includes a configuration, an operation, a trigger and a parameter. In this example, the component needs two parameters to be configured and includes three functions. At 284, a metamodel of the component is generated in JSON format, as an example. The metamodel may be generated automatically or in a combined automatic process based on input from a human operator or developer. The metamodel describes the configuration, the operation, the trigger and the parameter of the component as named parameters:

```
{
    "componentName": "Example library",
    "configuration": {
        "parameters": [
            {
                "name": "configParam1",
                "type": "string",
                "required": true
            },
            {
                "name": "configParam2",
                "type": "integer",
                "required": false,
                "defaultValue": 8
            }
        ]
    },
    "operations": [
        {
            "name": "FunctionA",
            "outputType": "string",
            "parameters": [
                {
                    "name": "param1",
                    "type": "string",
                    "required": true
                },
                {
                    "name": "param2",
                    "type": "integer",
                    "required": true
                }
            ]
        },
        {
            "name": "FunctionB",
            "outputType": "decimal",
            "parameters": [
                {
                    "name": "param1",
                    "type": "integer",
                    "required": false,
                    "defaultValue": 0
                },
                {
                    "name": "param2",
                    "type": "decimal",
                    "required": true
                }
            ]
        },
        {
            "name": "FunctionC",
            "outputType": {
                "typeId": "complexTypeA",
                "attributes": [
                    {
                        "name": "attributeA",
                        "type": "string"
                    },
                    {
                        "name": "attributeB",
                        "type": "string"
                    },
                    {
                        "name": "attributeC",
                        "type": "boolean"
                    }
                ]
            },
            "parameters": [
                {
                    "name": "param1",
                    "type": "string",
                    "required": true
                }
            ]
        }
    ]
}
```

Using Representational State Transfer (REST) as a non-limiting API style, the code above generates a microservice with an API, as described in steps 246, 248, and 252 of FIG. 2B. The microservice is generated entirely based on the metamodel without requiring development of additional coding by a software developer.

The microservice may be consumed in the following way. A configuration is created by a consumer, as described in step 212 of FIG. 2A, as below:

```
POST /configuration HTTP/1.1
Content-Type: application/json
{
    "parameters": [
        {
            "configParam1": "a String value",
            "configParam2": 10
        }
    ]
}
```

A configuration ID is generated, as described in step 258 of FIG. 2B, as below:

```
Content-Type: application/json
{
    "configId": "<<a configId>>"
}
```

In some cases, where the microservice is a stateless entity, a configuration is not necessary or minimal configuration is sufficient. In other cases, where the microservice connects with a remote data source and processes remote data in the form of database information, customer relationship management (CRM) credentials, database credentials, and other connection information, configuration files may be generated and used as described above.

Functions of the software component are invoked by the consumer and the functions receive their corresponding set of parameters, as needed for execution, as described in step 218 of FIG. 2A.

FunctionA is executed, as below:

```
POST /operation/FunctionA HTTP/1.1
{
    "operationName": "FunctionA",
    "configurationRef": "<<id returned by POST/configuration>>",
    "parameters": [
        {
            "param1": "a String value",
            "param2": 10
        }
    ]
}
```

FunctionB is executed, as below:

```
POST /operation/FunctionB HTTP/1.1
{
    "operationName": "FunctionB",
```

-continued

```
   "configurationRef": "<<id returned by POST/configuration>>",
   "parameters": [
      {
         "param1": 100,
         "param2": 23
      }
   ]
}
```

FunctionC is executed, as below:

```
POST /operation/FunctionC HTTP/1.1
{
   "operationName": "FunctionA",
   "configurationRef": "<<id returned by POST/configuration>>",
   "parameters": [
      {
         "param1": "a String value",
      }
   ]
}
```

Responsive to the functions being invoked, the deployed microservice responds with appropriate responses, as described in step 222 of FIG. 2A:
Execution of FunctionA produces a response, as below:
　　Content-Type: text/plain
　　<<The library's output>>
Execution of FunctionB produces a response, as below:
　　Content-Type: text/plain
　　<<The library's output>>
Execution of FunctionC produces a response, as below:

```
Content-Type: application/json
{
   "attributeA": "some value",
   "attributeB": "another value",
   "attributeC: true
}
```

At 286, the metamodel is made available for transformation into an API specification compatible with the predetermined protocol. The metamodel may further describe capabilities, semantics and dependencies of the software component. As used herein, a 'capability' of a software component is a higher-level solution behavior that typically serves multiple technological problems. Capability is typically understood and measured in terms of a number of tangible features that facilitates the implementation of a solution over a lifecycle of the component. The 'semantics' of a metamodel refers to the underlying architectural principle that guides and describes the process a component follows when executing a program in a specific language. In other words, semantics typically describes the relationship between the input and output functions of a component and provides an explanation of a model of computation of the component on a certain platform. A 'dependency' of a component is a relationship involving two or more elements related to the component, where a change of state in one or more elements leads to a potential for a change of state in one or more other elements.

Once the metamodel is available for transformation at 286, the process is complete and future consumers of the components may do so through the microservice framework as disclosed herein or, in some cases, via the conventional library access that was available before operation of the techniques disclosed herein. As described in detail above, a metamodel of a software component may be generated automatically and a microservice may be generated entirely based on the metamodel without requiring development of additional coding. The metamodel and microservice framework disclosed herein allows for more efficient use of reusable software components by developers, without requiring legacy code to be completely rewritten as would be the case if the conventional components were removed or made unavailable to existing processes.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system of FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), REpresentational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Predictive Product Availability for Grocery Delivery; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("application store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may be a system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.). To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for invoking a software component through a predetermined protocol, the method comprising:
   receiving a software component comprising at least one of a configuration, an operation, a trigger, and a parameter;
   providing a first metamodel of the software component, the first metamodel describing the configuration, the operation, the trigger and the parameter of the software component as named parameters;
   receiving a deployed microservice, wherein the microservice is generated based on the first metamodel;
   receiving an API specification, wherein the API specification is generated based on a second metamodel and compatible with the predetermined protocol;
   creating a new configuration of the software component on the deployed microservice, the new configuration having a software component endpoint compatible with the descriptions provided by either the first metamodel or the second metamodel;
   receiving a resource identifier that identifies the new configuration of the software component;
   using the resource identifier to send subsequent requests to the API specification;
   invoking functions of the software component using the parameter of the software component; and
   responsive to the functions of the software component being invoked, receiving responses from the deployed microservice.

2. The computer-implemented method of claim 1, wherein the resource identifier is provided by a bridge that transforms either the first metamodel or the second metamodel and translates the descriptions of the software component into corresponding features of the deployed microservice based on the predetermined protocol.

3. The computer-implemented method of claim 2, wherein the bridge intercepts the incoming requests to the deployed microservice and transforms the corresponding output from the deployed microservice into invocations compatible with the software component.

4. The computer-implemented method of claim 1, wherein the operation and the trigger are exposed in corresponding formats compatible with the predetermined protocol.

5. The computer-implemented method of claim 4 further comprising invoking the trigger and receiving a response from the software component.

6. The computer-implemented method of claim 1, wherein the new configuration of the software component is discarded after a predetermined period of idleness or at a chosen point of time.

7. The computer-implemented method of claim 1, wherein the first metamodel and the second metamodel are the same.

8. A computer-implemented method for exposing a software component through a predetermined protocol, the method comprising:
   receiving a software component comprising at least one of a configuration, an operation, a trigger, and a parameter;
   providing a metamodel of the software component, the metamodel describing the configuration, the operation, the trigger and the parameter of the software component as named parameters;
   generating a microservice based on the metamodel;
   generating an API specification based on the metamodel, the API specification being compatible with the predetermined protocol;
   deploying the microservice, wherein the deployed microservice accepts incoming requests described by the generated API specification;
   responsive to the incoming requests, receiving a formatted output from the deployed microservice, wherein the format of the output is compatible with the predetermined protocol;
   receiving a new configuration of the software component, wherein the new configuration is created on the deployed microservice;
   generating a resource identifier that identifies the new configuration of the software component; and
   responsive to subsequent incoming requests to the deployed microservice, using the resource identifier to interact with the software component.

9. The computer-implemented method of claim 8, wherein the resource identifier is generated by a bridge that transforms the metamodel and translates the descriptions of the software component into corresponding features of the deployed microservice based on the predetermined protocol.

10. The computer-implemented method of claim 9, wherein the bridge intercepts the incoming requests to the deployed microservice and transforms the corresponding output from the deployed microservice into invocations compatible with the software component.

11. The computer-implemented method of claim 8 further comprising maintaining the software component and the deployed microservice on a common code base.

12. The computer-implemented method of claim 11 further comprising providing a first set of applications that consume the software component and a second set of applications that consume the deployed microservice.

13. A computer-implemented method for metamodeling a software component through a predetermined protocol, the method comprising:
   providing a software component, wherein the software component comprises at least one of a configuration, an operation, a trigger and a parameter;
   generating a metamodel of the software component, the metamodel describing the configuration, the operation, the trigger and the parameter of the software component as named parameters; and
   making the metamodel available for transformation into an API specification compatible with the predetermined protocol,
   wherein the configuration comprises a set of default run-time application options used to customize non-deployment features of the software component,
   wherein the parameter characterizes the software component by a key-value pair comprising a parameter key representing a unique identifier for the parameter and a parameter value characterized by a parameter data type, and wherein the trigger is a mechanism that executes a program routine of the software component when a conditional event occurs on satisfaction of a predetermined condition.

14. The computer-implemented method of claim 13, wherein the operation comprises invoking functions of the software component using the parameter, the functions receiving a first set of parameters and generating corresponding outputs, and further wherein the trigger is initialized through a second set of parameters.

15. The computer-implemented method of claim 13, wherein the metamodel further describes capabilities, semantics and dependencies of the software component.

\* \* \* \* \*